United States Patent [19]
Davis et al.

[11] Patent Number: 5,054,291
[45] Date of Patent: Oct. 8, 1991

[54] MULTI-BAY SYSTEM FOR THE FORCED AIR POSTHARVEST CONDITIONING OF AGRICULTURAL CROPS

[76] Inventors: Thomas L. Davis, P.O. Box 18971, Raleigh, N.C. 27619; John P. Shell, 2706 Van Dyke Ave., Raleigh, N.C. 27607; Robert N. Elliott, III, 4504 Boxwood Rd., Raleigh, N.C. 27612

[21] Appl. No.: 557,641

[22] Filed: Jul. 25, 1990

[51] Int. Cl.⁵ .................. F25D 13/02; F25D 25/00
[52] U.S. Cl. ................................. 62/62; 62/407; 62/441; 62/442
[58] Field of Search ............... 62/62, 89, 407, 440, 62/441, 442, 443; 34/210, 231

[56] References Cited

U.S. PATENT DOCUMENTS

| | | | |
|---|---|---|---|
| 2,484,572 | 10/1949 | Jude | 62/442 X |
| 3,417,486 | 12/1968 | Vanicek | 34/231 X |
| 4,063,432 | 12/1977 | Chaussy et al. | 62/441 X |
| 4,345,443 | 8/1982 | Yamashita | 62/441 X |
| 4,505,126 | 3/1985 | Jones et al. | 62/441 X |
| 4,599,871 | 7/1986 | Fredrixon | 62/441 X |
| 4,753,020 | 6/1988 | Brunner | 34/210 X |

OTHER PUBLICATIONS

"Commercial Cooling of Fruits and Vegetables," Agricultural Publications, University of California, Jun. 1972.
ASHRAE Refrigeration Handbook, American Society of Heating, Refrigeration, and Air-Conditioning Engineers, Chapter 11, May 1990.

Primary Examiner—Henry A. Bennet
Assistant Examiner—Christopher Kilner
Attorney, Agent, or Firm—Richard S. Faust

[57] ABSTRACT

Agricultural crops are cooled immediately after harvest to prevent postharvest deterioration. A forced-air cooling system is utilized wherein air permeable containers of produce are stacked in rows within a warehouse to define multiple cooling bays. Each bay is independently operated for the sequential loading, cooling and unloading of its contents without appreciable energy losses to surrounding bays.

19 Claims, 4 Drawing Sheets

MULTI-BAY SYSTEM FOR THE FORCED AIR POSTHARVEST CONDITIONING OF AGRICULTURAL CROPS

FIELD OF THE INVENTION

The invention relates primarily to processes for preserving the freshness of fruits and vegetables after harvest. More particularly, the invention relates to postharvest conditioning of fruits and vegetables by subjecting them to a flow of air at a lowered or elevated temperature, and a novel multi-bay system that facilitates forced air produce conditioning with first in, first out processing.

BACKGROUND OF THE INVENTION

It is well known that fruits and vegetables, as living organisms, are in a continual state of deterioration from the time of their harvest. Successful marketing of fruits and vegetables depends upon reducing the rate of postharvest quality deterioration by slowing all biological activity. Therefore, attention has been focused on postharvest management of product environment to maintain quality and extend shelf life. The causes of postharvest deterioration and the beneficial effects of postharvest cooling is discussed in detail in "Commercial Cooling of Fruits and Vegetables", Agricultural Publications, University of California, December 1972 and "Methods of Precooling Fruits, Vegetables and Ornamentals", ASHRAE Refrigeration Handbook, American Society of Heating, Refrigeration, and Air-Conditioning Engineers, Chapter 11, 1990. For purposes of this discussion, as a general rule the postharvest precooling of fruits and vegetables is best achieved by rapidly cooling the produce as soon as possible after harvest with cool air having the highest possible humidity. The several methods for produce cooling are discussed below.

Room cooling is a method by which containers holding produce are stored in a room which is brought to a desired temperature and relative humidity. Since air is not forced by or through the produce, cooling is relatively slow, in some cases so slow that the produce may deteriorate to an unacceptable extent in the time required to cool it. Another disadvantage of room cooling is that the warehouse floor space is taken up for a much longer period of time for each load of produce which is cooled. Thus, more rapid cooling methods have been designed.

Vacuum cooling is a method by which certain produce, primarily leafy vegetables, are cooled by enclosing them in air tight chambers and pumping out air and water vapor. However, this method is not well adapted to nonleafy produce and is difficult to control.

Hydrocooling of produce is a method by which the produce is brought in contact with moving cold water. The most common hydrocoolers are conveyor hydrocoolers in which produce in bulk or containers is carrier on a conveyor through a shower of cold water.

Produce may also be cooled by forced-air cooling, also known as pressure cooling. According to this method, air permeable containers of produce are stacked in spaced apart, parallel rows on pallets. Cold air is forced to pass through the openings in the containers and around the produce by creating an air-return plenum between the adjacent rows of containers and utilizing a blower to create a pressure differential across the containers. These systems are described at pages 14-19 of the University of California publication referred to above. Forced-air systems increase the produce cooling rate significantly over the rate offered by room cooling; however, known forced air systems do not provide for independent, sequential loading, cooling and unloading of discrete bay areas to accommodate the arrival and departure of the produce conveyances, for example, tractor trailers. Thus, it becomes an object of the invention to provide operational advantages in the forced-air postharvest cooling of produce.

While most postharvest conditioning of produce involves cooling the produce, as outlined above, in certain circumstances it is desirable to condition the produce with air at an elevated temperature, for example, in the curing of sweet potatoes. As is well known, sweet potatoes continue their metabolic functions after harvest, primarily involving the conversion of certain starches to sugar. It is desirable to cure sweet potatoes after harvest at an elevated temperature on the order of 85° F. for several days to optimize the metabolic functions and to achieve desirable characteristics in the skin of the sweet potatoes. Thus, another object of the invention is to achieve operational advantages in the conditioning of produce at elevated temperatures, for example, in the curing of sweet potatoes.

SUMMARY OF THE INVENTION

The present invention provides an apparatus and method for the efficient forced air conditioning of produce, primarily but not exclusively the forced air cooling of produce. In one aspect, the invention may be defined as a multi-bay system located within a warehouse wherein the system comprises a plurality of aligned produce conditioners each of which is associated with its own independently operated bay. Each bay includes a suction plenum which is defined by stacked air permeable containers of produce, with the suction plenum communicating with an air suction port of the produce conditioner. Each bay also includes a substantially sealed conditioned air input chamber surrounding the suction plenum and in communication with a conditioned air discharge port of the produce conditioner. The air input chamber is defined by floor-to-ceiling partitions in the warehouse. One of the partitions is an end closure partition positioned at the end of the bay remote from the produce conditioner. The end closure partition is substantially aligned with the end closure partitions of the adjacent bays such that the plurality of end closure partitions open to a common floor portion of the warehouse to define a common forklift corridor for accessing the aligned bays.

In certain embodiments of the invention the containers of produce are stacked in rows that extend from the face of the produce conditioner on opposite sides of the air suction port. Means is provided for covering the space between the top of the rows and the end of the rows remote from the produce conditioner to define the air return plenum. This means may comprise a tarp that overlies the tops of the containers forming the rows.

In one embodiment the produce conditioners include air suction ports and conditioned air discharge ports on opposite faces thereof and means for selectively providing the air suction and discharge at one or the other face, thereby providing a multi-bay system including a plurality of bays on both sides of the aligned produce conditioners.

In another aspect, the invention comprises a method for the multi-bay forced air postharvest conditioning of fruits and vegetables wherein aligned independently operable produce conditioners are provided in a warehouse with each produce conditioner having an air suction port and a conditioned air discharge port on one face. Abutting air permeable containers of produce are loaded into a first one of the bays in a manner that defines a suction plenum communicating with the air suction port of the produce conditioner. Floor-to-ceiling partitions are provided to define a substantially sealed conditioned air input chamber surrounding the suction plenum. After loading the containers in the first bay conditioned air is supplied to that bay and directed through the produce and back through the suction plenum to the produce conditioner for reconditioning. The operation of the produce conditioner in the first bay is continued while containers of produce are loaded in a like fashion into the second and subsequent bays. The operator independently operates each of the multiple bays until such time as the produce therein has been adequately conditioned and thereafter stops the delivery of conditioned air to that bay, opens an openable one of the partitions and unloads the produce therefrom.

BRIEF DESCRIPTION OF THE DRAWINGS

Some of the objects having been stated, other objects will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
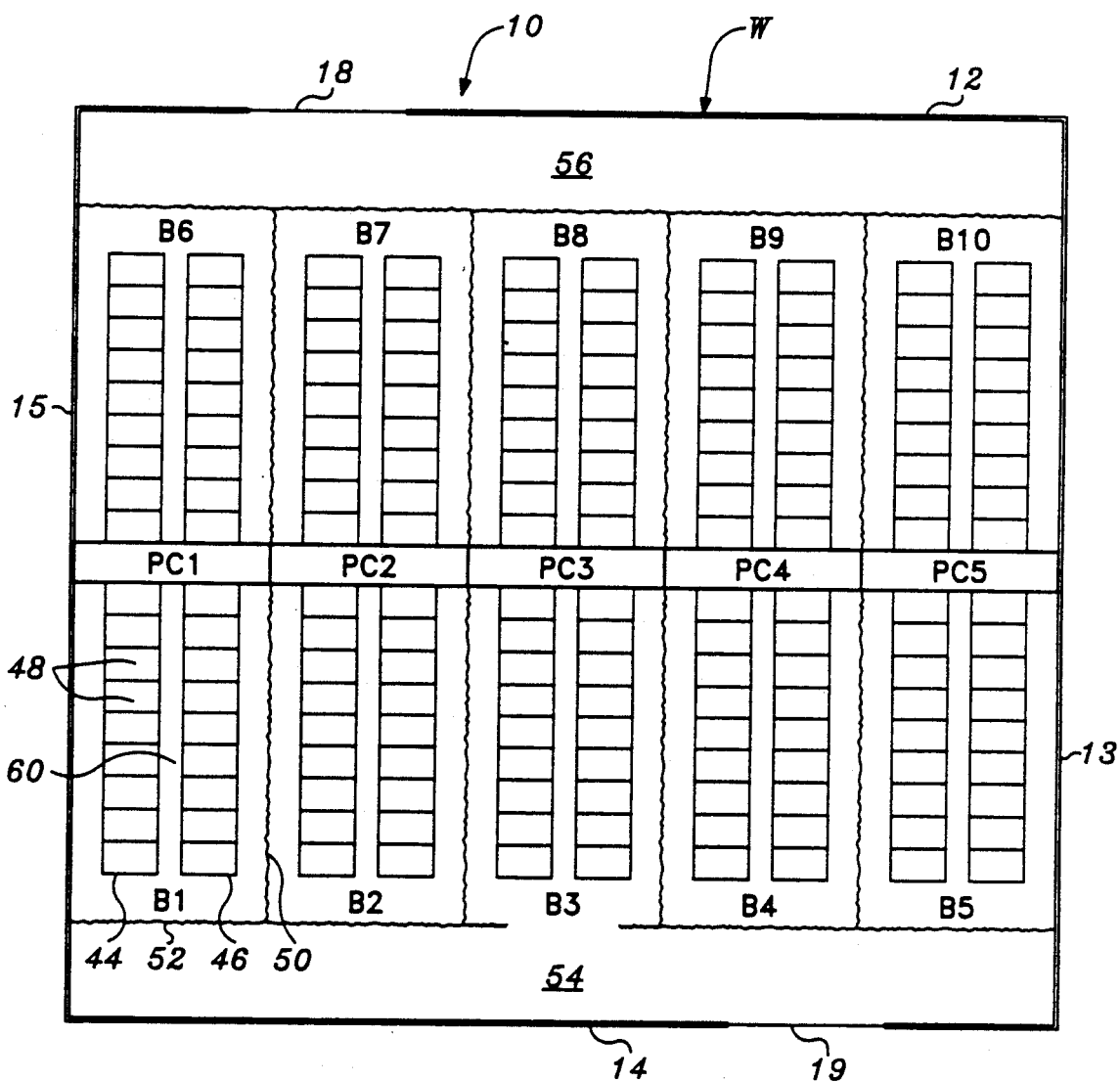
FIG. 1 is a schematic top view of a multi-bay system for the postharvest conditioning of fruits and vegetables.

Referring to the drawings, and particularly of FIG. 1, there is shown a multi-bay system constructed in accordance with the principles of the present invention. System 10 includes five "dual access" produce conditioners PC1–PC5 and ten bays B1–B10 located within a warehouse W or other suitable structure having exterior walls 12, 13, 14, 15 and access doors 18, 19.

The produce conditioners may take the form of direct contact water-to-air heat exchangers which are capable of supplying moisture laden conditioned air to the bays at either a lowered or an elevated temperature. Preferably, each produce conditioner extends substantially across the width of its respective bay and substantially floor-to-ceiling, thereby defining one end of the fully enveloped bay. As illustrated, a bay extends outwardly from each face of each produce conditioner, thereby providing ten bays five of which are aligned on one side of the produce conditioners and another five aligned on the other side.

A brief description of the preferred produce conditioner, water-to-air heat exchanger 20, will be described with reference to FIG. 3. Heat exchanger 20 is a large unit ($25'L \times 5'W \times 17'H$) that provides a pair of water-/air contact chambers 22, 24 located at the sides of a central air handling section 26. Air enters heat exchanger 20 through a lower air suction port 28 and conditioned air is discharged from the heat exchanger at an upper conditioned air discharge port 30. Air is forced through the system by a pair of fans, one of which is shown at 32. Water is supplied at the top of each chamber 22, 24 by a header (not shown) and is drained from the bottom of each chamber by a drain pan assembly 34. The chambers are provided with appropriate heat transfer media (not shown) so that an efficient heat transfer occurs as water descends through the chamber and air moves upwardly from the fans, through the chamber, through a mist eliminator 36 and out the discharge port 30.

Figure 3:
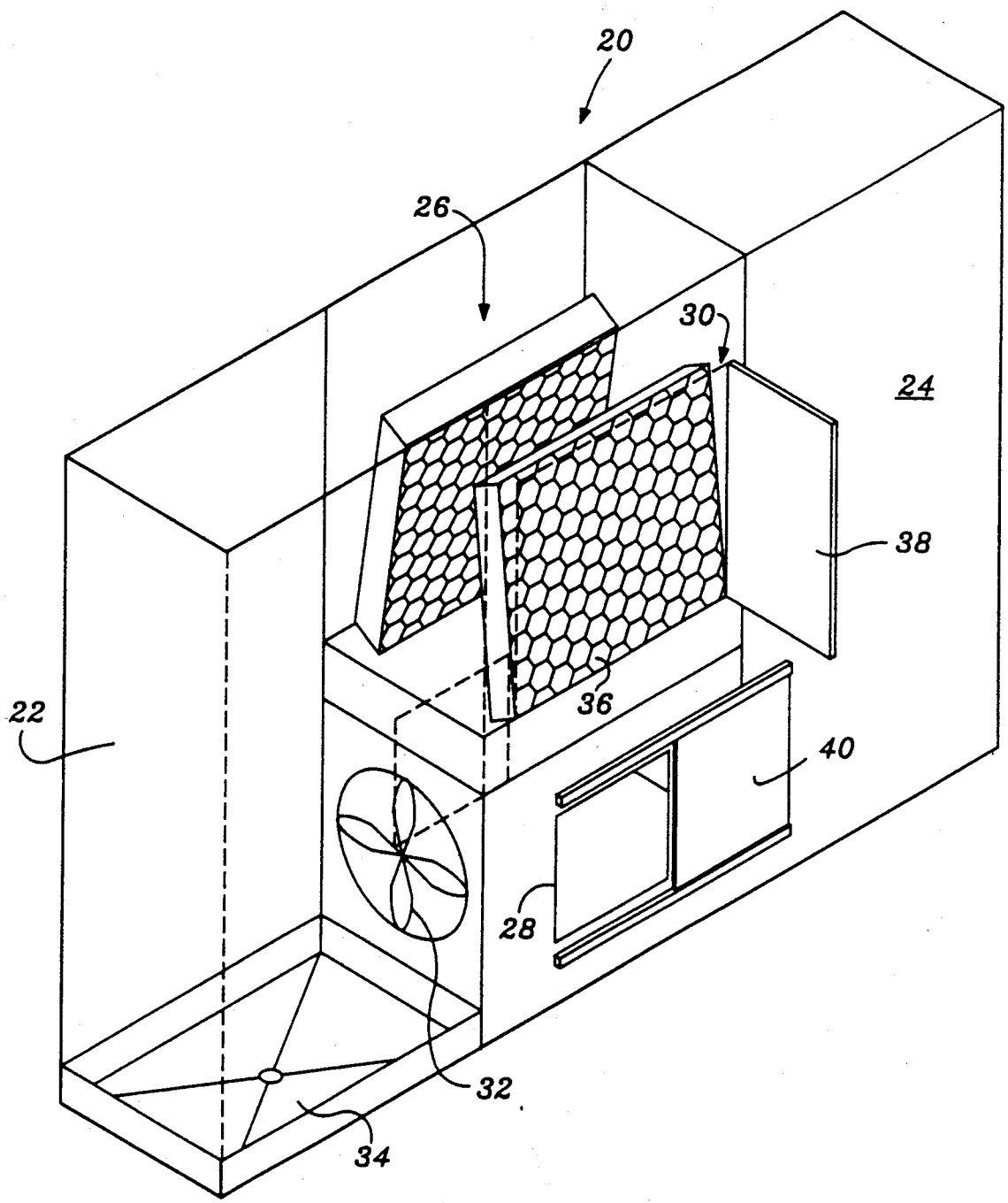
FIG. 3 is a partly broken away isometric view of a water-to-air heat exchanger used in association with each pair of bays of the multi-bay system.

The heat exchanger illustrated in FIG. 3 is a "dual access" unit that provides ports 28, 30 on both opposed faces thereof. A hinged door 38 is associated with each of the two ports 30 and a slidable door 40 is associated with each of the ports 28. Thus, the heat exchanger may be selectively operated on only one face, or may be operated on both faces by partly or completely opening the various doors.

While heat exchanger 20 may be connected to a source of cold water or a source of warm water, it will be appreciated that most applications of the invention will be for cooling produce. In this regard, the heat exchanger 20 may be connected to a water chiller, a cold water storage tank, an ice/water storage tank or other suitable source of cold water.

Each bay B1–B10 defines a substantially fully enveloped, independent produce conditioning zone. While the ten bays illustrated in FIG. 1 are shown as being substantially identical, it will be appreciated that certain variations may exist from bay to bay. Bay B1 includes two parallel elongated rows 44, 46 of stacked air permeable containers 48 of produce. Preferably, the rows extend substantially perpendicular to the face of produce cooler PC1 on opposite sides of the air suction port 28. In the illustrated embodiment, the air permeable containers of produce take the form of double wide bin boxes each of which contains approximately 80 bushels of produce in loose fill, bulk form. Each bin box is approximately four feet by seven feet as viewed in plan and approximately three feet tall. The bin boxes include air introduction slots or other openings which permit air to be forced through the bin boxes and through the produce in a random flow pattern. The bin boxes are readily adaptable for transport into and out of the warehouse by a forklift and, in the preferred manner of practicing the invention, are stacked two on top of each other, resulting in produce rows having a height of approximately six feet. In the illustrated embodiment each bay B1-B10 contains 36 double wide bin boxes of produce, 18 to a row.

While not illustrated, the air permeable containers of produce may take the form of heavy duty corrugated boxes or another suitable form.

As mentioned above, each bay is capable of independent operation. This independent operation is achieved by a system which permits the independent running of each produce conditioner PC1-PC5 and the provision of a substantially fully enveloped produce conditioning zone at each bay. The envelope of bay B1 is defined at the bottom by the warehouse floor, at the top by the ceiling of the warehouse, at one end by the floor-to-ceiling face of produce conditioner PC1, on the sides by warehouse wall 15 and by a floor-to-ceiling partition 50. The end remote from produce conditioner PC1 is defined by a openable and closable floor-to-ceiling partition 52 which preferably takes the form of a curtain adapted to slide open and closed.

In the illustrated embodiment the end closure curtains 52 for bays B1-B5 are substantially in alignment and open onto a common forklift corridor 54 which is defined by the warehouse floor space between the end closure curtains 52 and warehouse wall 14. An access door 19 for bays B1-B5 is provided in the wall. Likewise, on the opposite side of the warehouse bays B6-B10 communicate with a second forklift corridor 56 and wall 12 provides a second access door 18.

Figure 2:
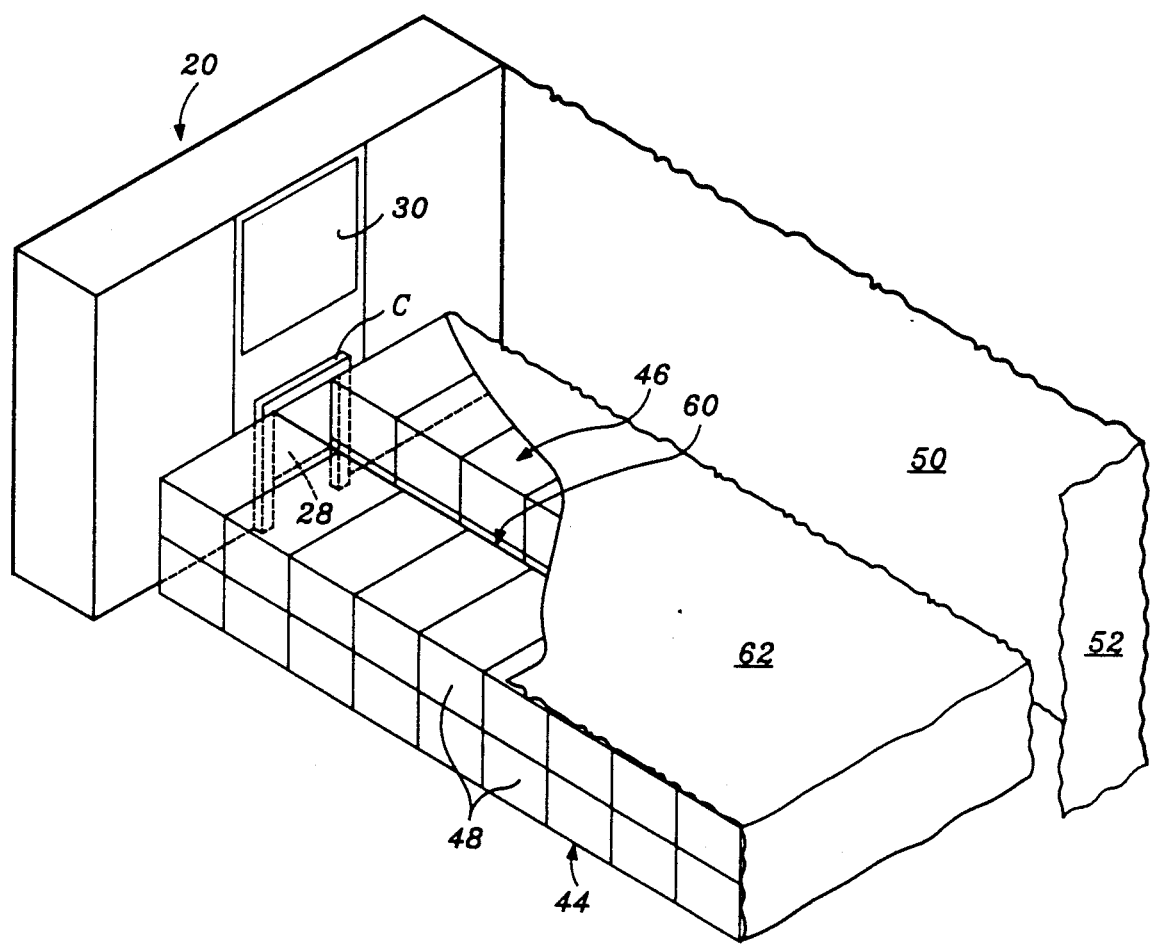
FIG. 2 is an isometric view of one bay area of the multi-bay system illustrated in FIG. 1 with a portion of the covering tarp and portions of the partitions not shown to facilitate illustration.

Each bay includes a suction plenum/corridor 60 which communicates with the air suction port 28 of the produce conditioner and provides a restricted path for the conditioned air so that the same must pass through the produce prior to being returned to the produce conditioner via the suction port. In the illustrated embodiment, the suction plenum/corridor 60 is defined as the space between the adjacent rows 44, 46 of containers. As best shown in FIG. 2, the containers at one end abut the produce conditioner and provide a substantially complete seal at their point of abutment through use of a foam, inverted U-shaped collar C. Suction plenum/corridor 60 is further defined by the floor of the warehouse between the two rows 44, 46 and the inwardly facing vertical faces of the two rows. Finally, the plenum is defined by an easily installed and removed tarp 62 or other sheet material member which covers the stacked rows 44, 46 both on the top and at the end remote from the produce conditioner. Preferably the sheet material extends fully across the tops of the rows and fully across the end thereby permitting air to pass through the produce containers only at the outer vertical faces of the rows. In another embodiment, not shown, the tarp covers only the top while the end of the plenum/corridor is defined by additional container(s) of produce.

Thus, in operation, air is introduced into the bay by means of the conditioned air discharge port 30. Since the bay is substantially fully enclosed, the conditioned air is essentially introduced into a sealed conditioned air input chamber which communicates directly only with port 30. The path of the conditioned air is restricted so that it flows substantially laterally through the two rows 44, 46 of produce into the suction plenum/corridor 60 and back to the produce conditioner via suction port 30. The fully enveloped closure of the bays and the independent operation of each produce conditioner permits the bays to be loaded, cooled or heated, and unloaded independently, preferably in a sequential fashion wherein a forklift, accessing each bay through its respective end curtain 52, may load and unload a bay while the produce in other bays is being conditioned. It will appreciate that the provision of independent, fully enclosed bays not only facilitates the above-described first in, first out produce processing operation, but also serves to minimize the cooling time for each truckload of produce because of the substantial reduction in the infiltration of hot air into the cooling zone from sources such as the opening and closing of warehouse doors in the loading and unloading operations. More details of the operation are given in the following examples.

EXAMPLE 1

A first example of an operating sequence for multibay system 10 will be described with reference to FIGS. 1 and 4. This example will describe the independent sequential loading, cooling and unloading of five aligned bays B1-B5 in a postharvest produce cooling operation. More particularly, the cooling operation involves approximately 150,000 pounds (5,000 bushels) of green peppers which arrive at the produce cooling facility at a temperature of approximately 95° F. The object of this operation is to cool the green peppers to a storage temperature of approximately 45° F., a total cooling load to the produce of approximately $12.35 \times 10^6$ BTUs.

The green peppers are often shipped out in tractor trailers each containing approximately 30,000 pounds (1000 bushels) of green peppers. Each bay B1-B5 is sized to hold the contents of one tractor trailer.

Figure 4:
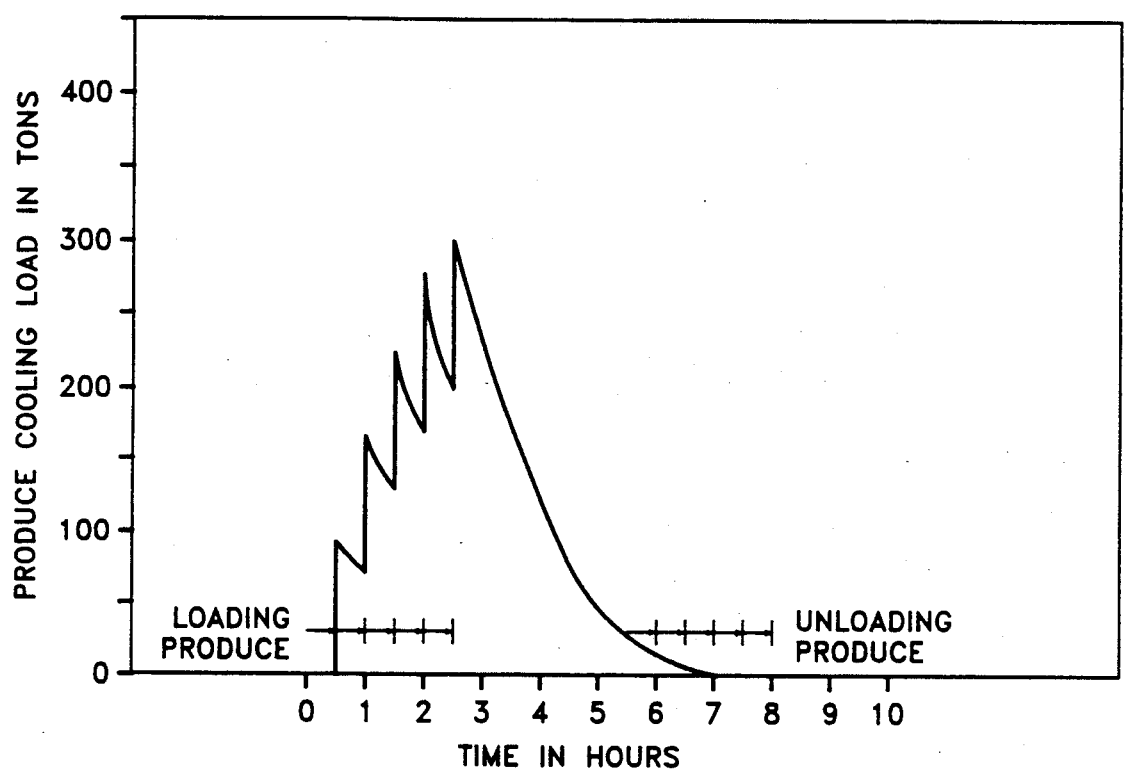
FIG. 4 is a graph that illustrates the sawtooth curve representative of the produce cooling load imposed by a multi-bay system of the invention during one day of sequential loading, cooling and unloading of five bays.

As shown in FIG. 4, the initial loading begins at hour 0, which corresponds to approximately 1:00 p.m. First, bay B1 is loaded by means of a forklift which gains access to warehouse W through door 19. The forklift utilizes forklift corridor 54 and passes through the opened end closure curtain 52 into the bay floor area. The forklift is able to stack the double wide bin boxes substantially as shown in FIG. 1 to establish two double high (approximately six feet high) rows 44, 46 of containers. Once the rows have been established, tarp 62 is placed over the top and ends of the rows 44, 46 to define suction plenum/corridor 60, end closure curtain 52 is closed and chilling of the produce begins by actuation of the produce conditioner PC1. This loading operation takes approximately 30 minutes.

The produce conditioners take the form of heat exchangers 20 as illustrated in FIG. 3. The heat exchangers are operated in conjunction with a long term thermal energy storage system as described in commonly assigned, copending application Ser. No. 543,169 entitled "Thermal Energy Production, Storage and Reclaim System" filed June 25, 1990. According to this system, the energy utilized to cool the produce is shifted from a direct acting basis to a long term low power level basis by the provision of a system which utilizes an ice machine which runs year-round to charge a thermal storage tank. During produce cooling operations, the chilled water from the ice storage tank is pumped to the heat exchangers to provide cooling.

Referring back to FIG. 4, it can be seen that bays B1-B5 are loaded at half hour intervals so that the loading of the fifth bay is completed at hour 2.5. The sawtooth curve illustrates the stepped produce cooling load during this loading period. The unloading of bay B1 commences at hour 5.5 and is accomplished over a one-half hour period while the remaining four bays continue cooling. Each bay is sequentially unloaded so that the fifth bay, bay B5, is completely unloaded at hour eight.

EXAMPLE 2

A second example of the operation of the multi-bay system will be described in connection with FIG. 5. According to this example all ten bays B1–B10 of FIG. 1 are operated to cool ten truckloads of green peppers, i.e., 300,000 pounds of produce (10,000 bushels), resulting in a total cooling from 95° F. to 45° F. of approximately $24.70 \times 10^6$ BTUs.

Figure 5:
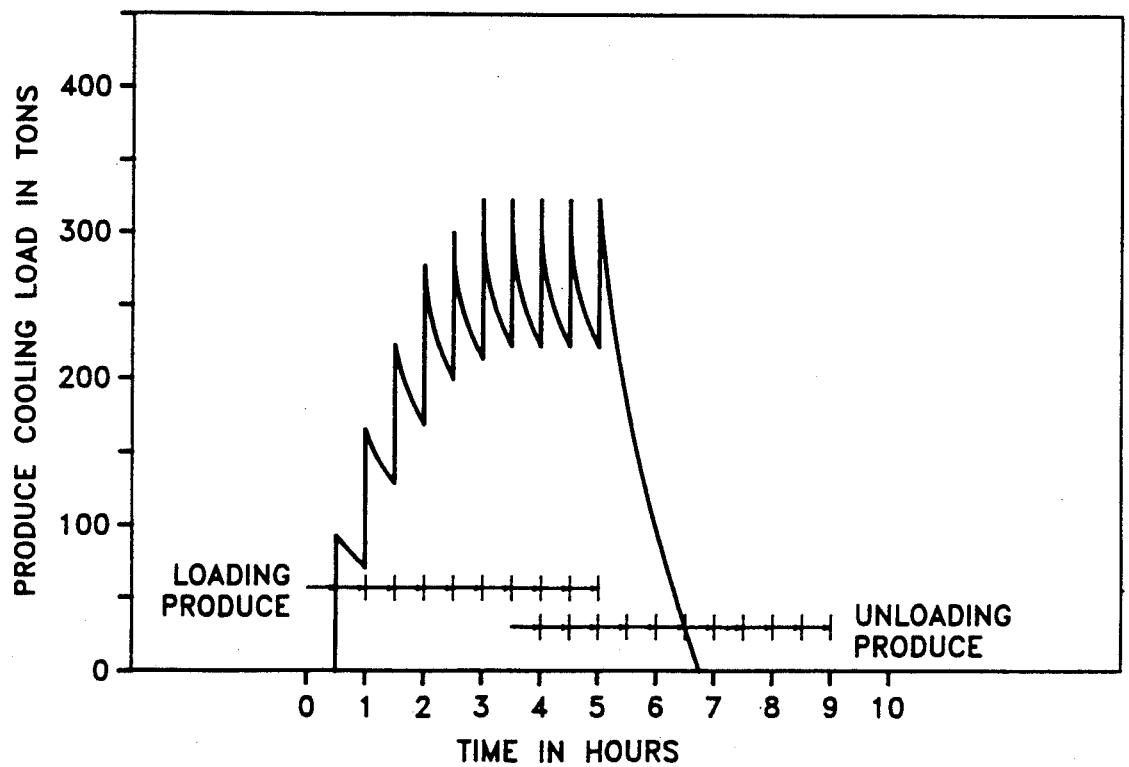
FIG. 5 is a graph similar to that of FIG. 4, but showing a curve for a day's operation of a dual access system including ten bays, five located on each side of the produce coolers.

As can be seen in FIG. 5, the loading operation begins at time 0 at bay B1. At hour 0.5 bay B1 is completely loaded and its respective produce conditioner PC1 commences cooling. Over the next nine one-half hour intervals, until hour 5, the remaining nine bays B2–B10 are sequentially loaded. As each of the first five bays is loaded its respective produce conditioner is activated. However, it will be appreciated that once bay B6 is loaded the cooling in bay B1 on the opposite side of produce cooler PC1 may or may not have not been completed. The sawtooth curve of FIG. 5 illustrates a situation where cooling has been completed in bay B1 when bay B6 is loaded.

While Examples 1 and 2 relate to postharvest precooling situations of a rather extreme nature, i.e., cooling from a high initial temperature of 95° F. to a low completed temperature of 45° F., it will be appreciated that in many instances the initial temperature may be significantly lower, for example, 85° F., and that the end temperature may be significantly higher, for example, 55° F.–60° F. In those cases less cooling energy is required for the produce, resulting in the ability to cool larger loads utilizing the same energy or the ability to cool the same volume of produce in a shorter time.

EXAMPLE 3

It will be appreciated that one advantage of the present invention is that it permits the multi-purpose utility of a warehouse in an agribusiness environment. This is achieved by the provision of partitions, whether in the form of curtains or other movable units, which are movable to subdivide the warehouse into any desired configuration. As an example of the use of a warehouse in a agribusiness environment wherein the multi-bay system of the invention is used year-round, the description will turn to an example of a warehouse used in the southeastern United States for an annual period starting in June. For approximately eight to ten weeks beginning in late June or early July the warehouse is subdivided into multiple bays substantially as shown in FIG. 1 for the postharvest forced air precooling of fresh produce. Beginning in September or October, with the warehouse in the same or similar subdivided arrangement, the warehouse is used for approximately two months during the peak harvest season for sweet potatoes to cure the sweet potatoes. Sweet potatoes should be cured at approximately 85° F. for several days. In this regard, it has been found that utilizing the system of the present invention with sweet potatoes introduced in the system at approximately 50° F.–60° F., it takes approximately 48 hours to bring the sweet potato load to a temperature of 85° F. After the first 48 hour period the sweet potatoes are then held at that temperature for an additional 48 hours. Thus, allowing for loading and unloading time, a cycle for curing sweet potatoes takes approximately five days.

Following the end of the two month sweet potato curing operation the warehouse is used as a cured sweet potato storage facility so that the operator may provide a year-round supply of cured sweet potatoes to his customers. In this regard, the long term storage of sweet potatoes ideally should take place at a holding temperature on the order of 55° F.–60° F. and at a relative humidity of at least 85%. Thus, utilizing the water-to-air heat exchangers 20 as depicted in FIG. 3, the warehouse is provided with near moisture saturated conditioned air throughout the period of November through approximately mid-June for sweet potato storage. It will be appreciated that as weather conditions at the warehouse location vary through the November–June period the operation of the heat exchangers will be controlled accordingly. Also of importance is that during the storage period the sweet potatoes continue their metabolic functions at a rate that generates significant heat in the warehouse—in view of their densely packed arrangement and relatively large volume. Thus, in the southeastern United States, even during the winter months, the primary utility of the heat exchangers, in addition to supplying the desired relative humidity to the warehouses atmosphere, is to cool the warehouse to the desired temperature, as opposed to heating.

In connection with the sweet potato holding period, it may very well be desirable to arrange the warehouse space with fewer partitions and to utilize as few as one or two of the produce conditioners. In this regard, the sweet potatoes may be stacked in a manner substantially different from the double row arrangement illustrated in FIG. 1. However, it is desirable that the sweet potatoes be stacked in such a fashion that a suction air plenum is established so that the conditioning air must pass through the produce prior to being delivered back to the suction port. In certain operations, instead of utilizing the tarp 62 discussed above, the spaces between rows of stored sweet potatoes may be bridged with palletized sweet potatoes or other air permeable containers of sweet potatoes.

While the present invention has been described in connection with illustrated embodiments, it will be appreciated that modifications may be made without departing from the true spirit and scope of the invention.

That which we claim is:

1. A multi-bay system located within a building for the forced air postharvest conditioning of agricultural crop, said system being characterized by the provision of independent produce loading, conditioning and unloading at each bay, said multi-bay system comprising:
    a plurality of independently operable produce conditioners, each produce conditioner providing on one face thereof an air suction port and a conditioned air discharge port;
    a bay associated with each produce conditioner, during operation each bay defining a substantially fully enveloped, independent produce conditioning zone and comprising
        a suction plenum defined by stacked air permeable containers of produce, said suction plenum communicating with said air suction port;
        means defining a substantially sealed conditioned air input chamber in communication with said conditioned air discharge port of the produce conditioner, said air input chamber surrounding said suction plenum, said means including impermanent, movable partitions extending floor-toceiling in said building, one of said partitions being an end closure partition positioned at the end of the bay remote from said produce conditioner;

said end closure partition being substantially aligned with the end closure partitions of the adjacent bays such that the plurality of end closure partitions open to a common floor portion of the building to define a common forklift corridor for accessing the aligned bays;

whereby each bay may be independently loaded through its respective end closure partition with air permeable containers of produce to define said suction plenum, each bay may be independently operated as a substantially sealed environment for conditioning its respective produce after closure of the end closure partition, and after conditioning the produce each bay may be unloaded by forklift or similar conveyances after opening the end closure partition and permitting access to the bay from the common forklift corridor.

2. The multi-bay system of claim 1 wherein the partitions comprise floor-to-ceiling curtains.

3. A multi-bay system located within a building for the forced air postharvest conditioning of agricultural crops, said system being characterized by the provision of independent, sequential produce loading, conditioning and unloading at each bay to render the system capable of accommodating the arrival and departure schedules of incoming and outgoing produce conveyances, said multi-bay system comprising:

a plurality of aligned independently operable produce conditioners, each produce conditioner providing on one face thereof a lower air suction port and an upper conditioned air discharge port;

the alignment of said produce conditioners defining a series of substantially aligned lower air suction ports at one elevation and a series of substantially aligned conditioned air discharge ports at another, higher elevation;

a bay associated with each produce conditioner, during operation each said bay defining a substantially fully enveloped, independent produce conditioning zone and comprising two parallel rows of stacked air permeable containers of produce, said rows extending from the face of the produce conditioner on opposite sides of the air suction port;

means for covering the space between the tops of said rows and the end of said rows remote from said produce conditioner;

a pair of impermanent, movable partitions extending substantially floor-to-ceiling, one of said partitions being disposed outwardly from each of said rows and extending the length thereof;

a third floor-to-ceiling end closure partition located at the end of said rows that is remote from the produce conditioner, said third partition connecting said first and second partitions and having associated means for opening and closing the same;

said produce conditioner, two rows of stacked containers, means for covering and three partitions defining (i) an enclosed air return plenum/corridor defined by the enclosed space between said rows, (ii) a substantially sealed conditioned air supply chamber surrounding said air return plenum/corridor and communicating with said air discharge port; and (iii) a portion of a forklift corridor located beyond said third partition and the third partition of adjacent bays;

whereby said multi-bay system permits independent operation of each bay and its respective produce conditioner for independent loading, conditioning and unloading of produce therein without appreciable energy losses to surrounding bay areas, and with easy access to each bay for loading and unloading by means of the common forklift corridor.

4. The multi-bay system of claim 3 wherein the produce conditioners include air suction ports and conditioned air discharge ports on opposite faces thereof and means for selectively providing the air suction and discharge at one or the other face, and said multi-bay system includes a plurality of bays on both sides of the aligned produce conditioners.

5. The multi-bay system of claim 3 wherein each produce conditioner extends substantially across the width of its respective bay and substantially floor-to-ceiling, thereby defining one end of a fully enveloped bay.

6. The multi-bay system of claim 3 wherein the produce conditioner are direct contact, water-to-air heat exchangers connected to a cold water source that comprises a cold storage tank charged by a long term charging cycle that shifts the produce cooling load from a direct acting basis to a long term low power level basis.

7. A multi-bay system located within a building for the forced air postharvest cooling of fruits and vegetables, said system being characterized by the provision of independent, sequential produce loading, cooling and unloading at each bay to render the system capable of accommodating the arrival and departure schedules of incoming and outgoing produce conveyances, said multi-bay system comprising:

a plurality of aligned independently operable produce coolers, each produce cooler having a pair of opposed faces;

a lower air suction port and an upper cold air discharge port located on each face of the produce coolers;

means for directing the air flow within said cooler to permit selective opening of the air suction and discharge ports on one selected face of the produce cooler;

the alignment of said produce coolers defining a series of substantially aligned lower air suction ports at one elevation and a series of substantially aligned cold air discharge ports at another, higher elevation on each side of the produce coolers;

two bays associated with each produce cooler with one bay extending from the first face thereof and another bay extending from the second face thereof, during operation each said bay defining a substantially fully enveloped, independent produce cooling zone and comprising two parallel elongated rows of stacked air permeable containers of produce, said rows extending substantially perpendicular to the face of the produce cooler on opposite sides of the air suction port;

sheet material covering the space between the tops of said rows;

a covering for the end of said rows remote from said heat exchanger;

a pair of substantially floor-to-ceiling curtains, one of said curtains being disposed parallel to and outwardly from each of said rows and extending the length thereof;

a third floor-to-ceiling end closure curtain located at the end of said row that is remote from the produce cooler, said third curtain connecting said first and second curtains and having associated means for opening and closing the same;

said produce cooler, two rows of stacked containers, sheet material, covering and three curtains defining (i) an enclosed air return plenum/corridor defined by the enclosed space between said rows, (ii) a substantially sealed cold air supply chamber surrounding said air return plenum/corridor and communicating with said air discharge port; and (iii) a portion of a forklift corridor located beyond said third curtain and the third curtain of adjacent bays;

whereby said multi-bay system permits independent operation of each bay and its respective produce cooler for independent loading, cooling and unloading of produce therein without appreciable energy losses to surrounding bay areas, and with easy access to each bay for loading and unloading by means of the common forklift corridor.

8. A method for the multi-bay forced air postharvest conditioning of fruits and vegetables characterized by the independent loading, conditioning and unloading of the bays, said method comprising;

providing independently operable produce conditioners in a building, each produce conditioner having an air suction port and a conditioned air discharge port on one face thereof;

loading abutting air permeable containers of produce into a first one of said bays in a manner that defines a suction plenum communicating with the air suction port of the produce conditioner;

providing floor-to-ceiling partitions defining a substantially sealed conditioned air input chamber surrounding the suction plenum;

after loading the containers in the first bay, beginning to supply conditioned air to the bay by means of the conditioned air discharge port, directing the air to the air input chamber and through the containers of produce, into the suction plenum and back to the produce conditioner for reconditioning;

continuing to operate the produce conditioner in the first bay while loading containers of produce in a like fashion into the second and subsequent bays; and independently operating each of the multiple bays until such time as the produce therein has been adequately conditioned and thereafter stopping the delivery of conditioned air to that bay, opening an openable one of the partitions and unloading the produce therefrom.

9. A method for the multi-bay forced air postharvest conditioning of fruits and vegetables characterized by the independent, sequential loading, cooling and unloading of the bays, said method comprising:

providing a series of aligned independently operable produce conditioners in a building, each conditioner having a lower air suction port and an upper conditioner air discharge port on one face thereof;

stacking two rows of air permeable containers of produce so that the rows extend outwardly from a first one of the produce conditioners on opposite sides of the lower air suction port;

covering the space between the tops of the rows of stacked containers with an easily installed and removed material and covering the end of the rows, thereby defining an enclosed air return plenum/corridor defined on two sides by the rows of stacked containers, on the top by the material, on the bottom by the building floor, on one end by covering the end, and at the other end by the face of the produce conditioner;

providing first and second floor-to-ceiling partitions that are outwardly disposed from the rows of stacked containers and an openable and closable third floor-to-ceiling partition located at the end of the air return plenum/corridor that is remote from the produce conditioner, thereby defining a substantially sealed conditioned air supply chamber that encloses the return plenum/corridor and communicates with the air discharge port;

after loading the containers to form the stacked rows in the first bay, closing the third partition of the first bay and beginning to supply conditioned air to the bay by means of the conditioned air discharge port, directing the air to the air supply chamber and through the rows of stacked containers of produce and into the air return plenum/corridor and back to the produce conditioner for reconditioning;

continuing to operate the produce conditioner in the first bay while loading rows of stacked containers of produce into the second and subsequent bays;

independently operating each of the multiple bays until such time as the produce therein has been adequately conditioned and thereafter stopping the delivery of conditioned air to that bay, opening the third partition and unloading the produce therefrom.

10. The method of claim 9 including the step of sizing each bay to hold the contents of one produce conveyance, e.g., a tractor trailer.

11. The method of claim 9 including the step of using the warehouse floor external of the third partitions as a common forklift corridor.

12. The method of claim 9 wherein the mentioned first and second floor-to-ceiling partitions comprise curtains that are shared by adjacent bays.

13. The method of claim 12 wherein one floor-to-ceiling partition of each of the two external bays comprises a wall of the building.

14. The method of claim 9 wherein the step of covering the end of the rows of stacked containers of produce is accomplished with sheet material.

15. The method of claim 9 wherein the step of covering the end of the rows of stacked containers of produce is accomplished by utilizing additional containers of produce.

16. The method of claim 9 including the step of utilizing a single prime mover to operate all of the produce coolers.

17. The method of claim 16 wherein the prime mover is an ice machine and the produce coolers are water-to-air heat exchangers, and including the steps of operating the ice machine over a long term period, storing the generated ice in an ice/water mixture in a thermal storage tank and pumping water from the storage tank to the heat exchangers during produce cooling operations.

18. The method of claim 9 including the steps of providing selectively activated lower air suction ports and conditioned air discharge ports on opposite faces of each produce conditioner, providing a bay on each side of each produce conditioner, thereby establishing a multi-bay system with two bays per produce conditioner.

19. The method of claim 9 including the step of sizing the produce conditioners so that each produce conditioner extends substantially across the width of its respective bay and substantially floor to ceiling, thereby defining one end of its respective bay.

* * * * *